Sept. 6, 1949.                P. T. MILLER                2,481,139
                              TRAILER HITCH
                           Filed March 31, 1947

INVENTOR
PAUL T. MILLER
BY Liverance and
Van Antwerp
ATTORNEYS

Patented Sept. 6, 1949

2,481,139

UNITED STATES PATENT OFFICE 2,481,139

TRAILER HITCH

Paul T. Miller, Byron, Mich.

Application March 31, 1947, Serial No. 738,293

2 Claims. (Cl. 280—33.17)

1

The present invention is in connection with trailer hitches for detachably connecting a trailer to a tractor or other motor vehicle which is to pull the trailer.

It is the purpose of the present invention to provide a very practical, sturdy and rugged hitch which is of great utility in detachably connecting a pulling apparatus, such as a truck or other pulling vehicle, with a trailer vehicle which is to be drawn thereby and with which connection is very readily performed, as is also disconnection, when wanted. A further object of the invention is to provide a trailer hitch which is economical to produce and is very easily operated in connection and disconnection by the driver of a motor vehicle without requiring the assistance of others and without encountering severe conditions of operation in such connection and disconnection.

An understanding of the invention may be had from the following description, taken in connection with the accompanying drawing, in which Fig. 1 is a plan view of one of the two hitch members, one of which is fixedly secured to a tractor, truck or other motor vehicle, and the other to the trailer.

Fig. 2 is a side elevation partly in section showing the hitch with both hitch members connected.

Fig. 3 is a fragmentary under plan view and section substantially on the plane of line 3—3 of Fig. 2.

Fig. 4 is a transverse vertical section on the plane of line 4—4 of Fig. 2, and

Fig. 5 is a transverse vertical section on the plane of line 5—5 of Fig. 1.

Like reference characters refer to like parts in the different figures of the drawing and the sections are taken looking in the directions indicated by the arrows.

The members 1 and 2 (Fig. 2) are parts on the pulling vehicle and the trailer to which the two detachable hitch members are connected. It is apparent that either of the hitch members may be connected to the trailer and the other to the pulling vehicle as the connection of the two hitch members may be made irrespective of which is secured to the pulling implement or the trailer. Upon the member 2 a ball-like head 3 of a generally spherical form at its under side has an integral short neck 4 at the lower end of which is a flange 5 located against the upper side of the member 2. This forms one of the two parts of the hitch and it is permanently secured, for example, to the member 2 by a bolt or set screw 6 as shown in Fig. 2.

The other part of the hitch includes a body of channel form having a horizontal web 7 and parallel upwardly extending side flanges 8 and 9. The web may be securely connected to the member 1 by bolts. At the outer end of said channel member an inverted cup-like member 10 is located and permanently welded at its sides at 11 to the end portions of the flanges 8 and 9. The cup-like housing 10 is open at its underside and has a cylindrical recess into which the spherical ball, or head 3, is received, as best shown in Fig. 5.

A lug 12 is welded, or otherwise permanently secured at the upper side of the web 7 and at the inner side of the flange 8 at a distance from the housing 10; and at a further distance therefrom a keeper 13 is welded, or otherwise permanently secured, to a flange 8 adjacent its upper edge.

A latching rod 14 passes slidably through the lug 12. At its end away from the housing 10, it is bent at right angles to provide a vertically positioned handle 15. A coiled tension spring 16 is secured at one end to the handle 15 and at the other end to a bolt of equivalent anchor 17 for it mounted on the flange 8 and extending inwardly therefrom between the lug 12 and the housing 10. The outer end portion of the rod 15 is adapted to pass through alined openings 18 in a side of the housing 10 so that it will come below the horizontal diameter of the ball, or head 3 (Fig. 5) and lock said ball or head, against disconnection from the housing 10. The spring 16 when free to do so, moves said rod 14 through the openings in the housing 10 which rod extends through the housing and is supported at its under side where passing through the housing all of the length thereof received in the housing.

When the parts are connected, as shown in Figs. 4 and 5, secure attachment of a trailer to its pulling implement is made and one which will not disconnect until the latching rod is withdrawn. Said rod may be withdrawn by pulling on its handle 15 against the spring 16 and engaging it with the keeper 13 as indicated in Fig. 1, whereupon said ball or head 3 and its housing 10, may be readily separated. When a connection is to be made, the locking rod 14 is withdrawn and it is horizontally engaged with the keeper 13, the ball or head 3 entered into said housing, after which the locking rod is released to be moved to locking position, which position it takes automatically upon release.

The structure is very sturdy and durable, is economically produced and is particularly easy to operate in the engaging and disengaging operations thereof.

The invention is defined in the appended claims and is to be considered comprehensive of all forms of structure coming within their scope.

I claim:

1. In a structure of the class described, a hitch member including a support of channel form having a base web and side flanges extending at right angles therefrom, a cylindrical socket member at one end of said base and located between the ends of said flanges permanently secured to said base and flanges, said socket member having a cylindrical recess therein open at one end, a latching rod located in substantial parallelism to one of said flanges adjacent said base web and inside said flange, said socket member having a passage through it adjacent its open end and at a side thereof and at a side of the recess therein, through which said latching rod is adapted to pass, yielding means for normally moving said latching rod through the passage in the socket, a second hitch member, including a ball-like head adapted to be inserted in the opening in said socket member and having means extending therefrom for connection to a support, said latching rod being withdrawn when the head is inserted and released after such insertion to lock the head in the socket member, the position of said rod adjacent the open end of the socket member being outwardly of the diameter of said head which generally parallels the open end of the socket member, said latching rod when passing through said socket member extending at one side partly into the opening in the socket member and at the other side seating against the adjacent sides of the passage through the socket member through which it passes.

2. In a structure of the class described, a hitch member including a support of channel form having a base web and side flanges extending at right angles therefrom, a cylindrical socket member at one end of said base and located between the ends of said flanges permanently secured to said base and flanges, said socket member having a cylindrical recess therein open at one end, a latching rod located in substantial parallelism to one of said flanges adjacent said base web and inside said flange, said socket member having a passage through it adjacent its open end and at a side thereof and at a side of the recess therein, through which said latching rod is adapted to pass, yielding means for normally moving said latching rod through the passage in the socket, the rod extending partly into said opening in the socket member when it is passed therethrough, a second hitch member, including a ball-like head adapted to be inserted in the opening in said socket member and having means extending therefrom for connection to a support, said latching rod being withdrawn when the head is inserted and released after such insertion to lock the head in the socket member, the position of said rod adjacent the open end of the socket member being outwardly of the diameter of said head which generally parallels the open end of the socket member, means on the latching rod for manually withdrawing it against said spring means, and means for holding the rod in said last mentioned position.

PAUL T. MILLER.

REFERENCES CITED

The following references are of record in the file of this patent:

UNITED STATES PATENTS

| Number | Name | Date |
|---|---|---|
| 2,237,031 | Gilmore | Apr. 1, 1941 |
| 2,295,021 | Weiss | Sept. 8, 1942 |

FOREIGN PATENTS

| Number | Country | Date |
|---|---|---|
| 374,065 | Great Britain | May 24, 1932 |
| 421,730 | Great Britain | Dec. 31, 1934 |